US006969071B2

(12) United States Patent
Berard

(10) Patent No.: US 6,969,071 B2
(45) Date of Patent: Nov. 29, 2005

(54) FACE SEAL ASSEMBLY

(75) Inventor: Gerald M. Berard, North Providence, RI (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 10/217,928

(22) Filed: Aug. 13, 2002

(65) Prior Publication Data

US 2004/0046322 A1    Mar. 11, 2004

(51) Int. Cl.⁷ .............................................. F16J 15/34
(52) U.S. Cl. ...................... 277/370; 277/399; 277/405; 285/281; 285/360
(58) Field of Search ................................ 277/370, 375, 277/499, 405, 326, 399; 285/360, 336, 281

(56) References Cited

U.S. PATENT DOCUMENTS

| | | | | |
|---|---|---|---|---|
| 1,930,833 A | * | 10/1933 | Barrett | 285/281 |
| 2,305,725 A | * | 12/1942 | Meyer | 285/281 |
| 2,331,615 A | * | 10/1943 | Meyer | 285/276 |
| 3,058,761 A | * | 10/1962 | Christophersen | 285/281 |
| 3,547,452 A | * | 12/1970 | Hirata | 277/358 |
| 3,624,809 A | * | 11/1971 | Beninga | 277/405 |
| 3,649,056 A | * | 3/1972 | Frohlich et al. | 285/276 |
| 3,746,350 A | * | 7/1973 | Mayer et al. | 277/399 |
| 3,782,735 A | | 1/1974 | Novosad | |
| 3,948,533 A | * | 4/1976 | Novosad | 277/370 |
| 4,314,704 A | * | 2/1982 | Wichall | 277/399 |
| 4,391,450 A | * | 7/1983 | Beck | 277/306 |
| 4,418,919 A | * | 12/1983 | Wentworth | 277/371 |
| 4,425,699 A | * | 1/1984 | Nordin | 29/505 |
| 4,436,315 A | * | 3/1984 | Hatch et al. | 277/370 |
| 4,613,142 A | * | 9/1986 | Heilala | 277/399 |
| 4,632,431 A | * | 12/1986 | McCracken | 285/13 |
| 4,773,655 A | * | 9/1988 | Lummila et al. | 277/399 |
| 4,779,876 A | * | 10/1988 | Novosad | 277/397 |
| 5,174,614 A | * | 12/1992 | Kaleniecki | 285/279 |
| 5,199,720 A | * | 4/1993 | Radosav et al. | 277/370 |
| 6,086,069 A | * | 7/2000 | Bedford | 277/380 |
| 6,244,345 B1 | * | 6/2001 | Helms | 166/301 |
| 6,412,784 B1 | * | 7/2002 | Cohen | 277/385 |

* cited by examiner

Primary Examiner—Alison K. Pickard
(74) Attorney, Agent, or Firm—Iandiorio & Teska

(57) ABSTRACT

A face seal assembly including an annular mating ring housing having a proximal end surface with a channel therein, a mating ring insert disposed in the channel, the mating ring insert including a mating ring compressed within a first band to maintain the integrity of the mating ring. An annular sealing ring housing has a distal end surface with a channel therein, and a sealing ring insert is disposed in the channel, the sealing ring insert including a sealing ring compressed within a second band to maintain the integrity of the sealing ring. The mating ring faces the sealing ring to prevent fluid from escaping therebetween. A method of making such a face seal assembly is also disclosed as is a complete face seal assembly useful in the top drive unit of an offshore drilling unit.

61 Claims, 12 Drawing Sheets

FACE SEAL ASSEMBLY

FIELD OF THE INVENTION

This invention relates to a new face seal useful in, inter alia, applications where the inner diameter of the face seal is subject to high pressures. This invention also relates to a complete face seal assembly useful, inter alia, in connection with the top drive drilling unit of an offshore or land based drilling rig.

BACKGROUND OF THE INVENTION

The top drive drilling unit of an offshore drilling rig includes a stationary pipe and a rotating pipe disposed in a housing. A caustic and abrasive fluid called mud in the industry flows from the stationary pipe to the rotating pipe at pressures in excess of 5,000 psi. The mud is used to break up rocks and sediment on the ocean floor.

To seal the stationary pipe with respect to the rotating pipe, "V-type" rubber packing material is used. This packing material generates excessive heat and when the packing fails, it can take between one to five hours to replace the packing resulting in costly down time for the drilling operations. Moreover, the top drive unit itself is located about 20 feet up off the drilling platform and workmen must use sledgehammers to replace the packing resulting in a frustrating and hazardous procedure. And, when the packing fails, it fails catastrophically resulting in many barrels of expensive mud being spilled at a cost of a thousand dollars per barrel. Also, the spilled mud must be reclaimed at a significant cost. Worse yet, the packing type seal is inconsistent and sometimes only lasts 5 hours and other times lasts 500 hours.

Thus, the prior art packing seal has plagued the drilling industry with inconsistent seal life, high torque and heat generation, and catastrophic leakage when the seal fails.

Mechanical face seals, known in other industries, have not been used in the drilling industry due to the extreme operating conditions and caustic environment. Also, face seals are usually constructed from brittle ceramic material which, when subjected to high internal pressures, would crack and fail. Indeed, those skilled in the art of mechanical face seals have studied the drilling industry top drive unit and concluded that conventional mechanical face seals could not be used.

In this invention, a mechanical face seal assembly was designed and tested for a top drive unit and, based on the test results, is expected to give consistent, reliable performance for no less than 500 hours of normal operation.

SUMMARY OF THE INVENTION

It is therefore an object of this invention to provide a face seal useful, inter alia, in applications where the inner diameter of the face seal is subjected to high pressures.

It is a further object of this invention to provide a complete face seal assembly for, inter alia, the top drive unit of an offshore drilling rig.

It is a further object of this invention to provide such a face seal which can be installed in ½ hour or less compared to the 1–5 hours required to install prior art V-packing seals.

It is a further object of this invention to provide a face seal which exhibits a mean-time-between failures an order of magnitude greater than prior art V-packing seals.

It is a further object of this invention to provide a face seal assembly which is simple and easy to install.

It is a further object of this invention to provide such a face seal assembly which is much more reliable than prior art V-packing type seals even in a caustic environment.

It is a further object of this invention to provide such a face seal which, because of its reliability and long meantime-between failures, severely reduces costly downtime.

It is a further object of this invention to provide a face seal assembly which, even when it fails, does not result in the catastrophic release of drilling fluid.

It is a further object of this invention to provide such a face seal assembly which is useful in industries and applications other than offshore drilling applications.

The invention results from the realization that a face seal can be constructed to withstand high internal pressures if the mating and sealing rings are radially compressed by a band, for example, to offset the force of the high internal pressures and to prevent cracking of the rings. The band maintains the brittle ceramic rings in hoop compression and minimizes any tensile stresses from axial or radial stresses.

This invention features a face seal assembly comprising an annular mating ring housing having a proximal end surface with a channel therein, a mating ring insert disposed in the channel, the mating ring insert including a mating ring compressed within a first band to maintain the integrity of the mating ring, an annular sealing ring housing having a distal end surface with a channel therein, and a sealing ring insert disposed in the channel, the sealing ring insert including a sealing ring compressed within a second band to maintain the integrity of the sealing ring. The mating ring faces the sealing ring to prevent fluid from escaping therebetween.

The mating ring and the sealing ring thus each define a sealing face with an inside diameter and an outside diameter and the fluid is typically pressurized on the inside diameter. Typically, both the mating ring and the sealing ring are made of a ceramic material, e.g., silicon carbide, and the first and second bands are made of metal, e.g., stainless steel.

In the preferred embodiment, the first band is press fit against one side of the channel in the mating ring housing and the second band is press fit against one side of the channel in the sealing ring housing. Also, the channel in the proximal end surface of the mating ring housing includes a step and the first band is disposed on the step. Bonding material is disposed between the channel and the mating ring for preventing fluid from escaping behind the mating ring. And, the distal end surface of the sealing ring housing also typically includes a step and the second band is disposed on the step. Bonding material is also disposed between the channel and the sealing ring for preventing fluid from escaping behind the sealing ring.

In one embodiment, the mating ring includes a lower outer chamfer and the first band includes a lower inner chamfer; and the sealing ring includes a lower outer chamfer and the second band includes a lower inner chamfer. The sealing face of the mating ring extends slightly beyond the first band and the sealing face of the sealing ring extends slightly beyond the second band.

In one example, a complete face seal assembly also includes a first coupling such as an annular gland assembly coupled to a distal portion of the mating ring housing. The first annular gland assembly may include a proximal end with a recess therein for receiving the distal end of the mating ring housing and an O-ring seal disposed between the distal end of the mating ring housing and the proximal end of the first annular gland assembly. Typically, the distal end of the mating ring housing includes a reduced diameter portion received in the recess of the proximal end of the first annular gland assembly and one or more pins interconnect the reduced diameter portion of the mating ring housing with the proximal end of the first annular gland assembly. The distal end of the first annular gland assembly typically includes a seat surrounded by a cowling for receiving a drive pipe therein and the drive pipe has male threads and the cowling includes female threads mating therewith. The seat typically includes an O-ring seal member disposed in a channel in groove in the seat.

A second coupling includes a second annular gland assembly with a proximal end having a seat for receiving a drive pipe therein. The seat of the second annular gland assembly typically includes an O-ring seal member disposed in a groove in the seat. The seat is surrounded by a collar which includes internal threads mating with external threads of the drive pipe.

The second coupling may also include a sleeve and the second annular gland assembly has a distal end surrounding the sleeve which is coupled to the proximal end of the sealing ring housing. One or more pins interconnect the sleeve assembly to the second gland assembly and a dynamic seal is disposed between the proximal end of the sleeve and the second annular gland assembly. One or more pins also couple the sleeve to the proximal end of the sealing ring housing and an O-ring seal is disposed between the distal end of the sleeve and proximal end of the sealing ring housing.

Typically, the sleeve includes a collar for receiving the proximal end of the sealing ring housing. The second coupling may also include a cover disposed over the sealing faces of the mating ring and the sealing ring. The cover extends between the first gland assembly and the second gland assembly and includes hooks receivable by the first gland assembly removably coupling the cover thereto. Finally, a spring is disposed between the collar of the sleeve and the distal end of the second gland assembly.

This invention also features a mechanical face sealing assembly comprising a first pipe having a distal end, a second pipe having a proximal end spaced from the distal end of the fist pipe, the first and second pipes rotatable with respect to each other, a first compressed ring having a tribological sealing face, and a second compressed ring having a tribological sealing face, the tribological sealing face of the first ring facing the tribological sealing face of the second ring for sealing the first pipe with respect to the second pipe. Typically, the first and second compressed rings are made of ceramic material each compressed by a body such as a metal band shrunk fit about them.

In the preferred embodiment, there is also a first housing for the first compressed ring and a second housing for the second compressed ring. Both housings may include a channel for receiving the ring and further included are couplings for connecting the housings to the pipes.

In one example, the first pipe is stationary, the first compressed ring is a mating ring, the second pipe rotates, and the second compressed ring is a sealing ring.

A mechanical face seal in accordance with this invention features a ring defining a tribological sealing face surrounding a direction of the high pressure, and a body disposed about the ring radially compressing the ring in the region of high pressure. The ring is typically made of a ceramic material, and the body is a metal band. Also included may be a housing with a surface having a channel therein which receives both the ring and the body. The ring is a sealing ring or also a mating ring. Also included may be a coupling or gland assembly for connecting the housing to a shaft. In one example, the shaft is a pipe.

A method of making a face seal, in accordance with this invention, includes forming a ring made of ceramic material and compressing the ring within a body to maintain the integrity of the ring. The ring is typically shrunk fit within the body, e.g., a band. Typically, the band and the ring are both disposed within a housing.

A method of making a face seal assembly in accordance with this invention features forming an annular mating ring housing to have a proximal end surface with a channel therein, disposing a mating ring insert in the channel, the mating ring insert including a mating ring compressed within a first band to maintain the integrity of the mating ring, forming an annular sealing ring housing to have a distal end surface with a channel therein, and disposing a sealing ring insert in the channel, the sealing ring insert including a sealing ring compressed within a second band to maintain the integrity of the sealing ring. The mating ring is oriented to face the sealing ring to prevent fluid from escaping therebetween.

A face seal assembly disposed to seal a first shaft with respect to a second shaft in accordance with this invention includes an annular mating ring housing having a proximal end surface with a channel therein, a mating ring insert disposed in the channel, the mating ring insert including a mating ring compressed within a first band to maintain the integrity of the mating ring, an annular sealing ring housing having a distal end surface with a channel therein, and a sealing ring insert disposed in the channel, the sealing ring insert including a sealing ring compressed within a second band to maintain the integrity of the sealing ring. A first coupling connects the mating ring housing to the first shaft and a second coupling connects the sealing ring housing to the second pipe.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
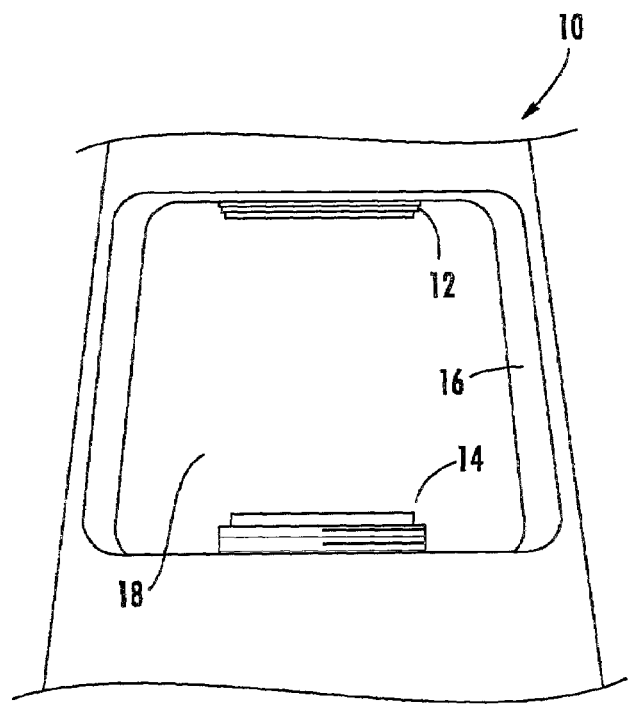
FIG. 1 is a schematic view showing the top drive unit of a particular offshore drilling system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
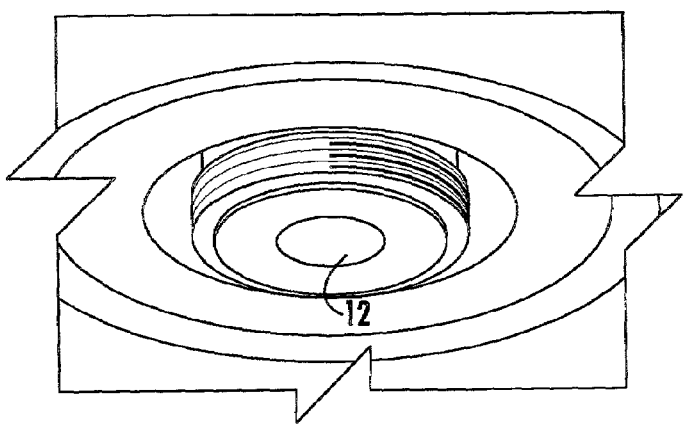
FIG. 2 is a schematic view showing the upper drive pipe of the top drive unit shown in FIG. 1.
Figure 3:
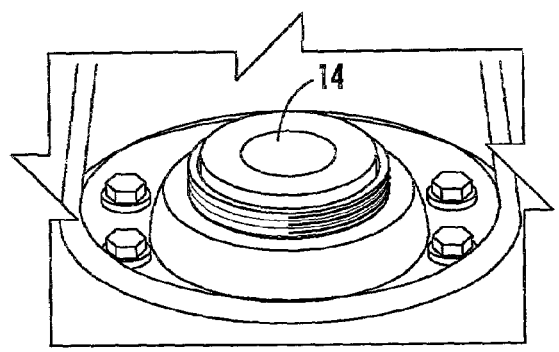
FIG. 3 is a schematic view showing the lower rotating drive pipe of the top drive unit shown in FIG. 1.

FIG. 1 shows top drive unit 10 of a particular drilling system which includes upper stationary drive pipe 12 and lower rotating drive pipe 14 within housing 16. FIGS. 2 and 3 also show upper pipe 12 and lower pipe 14, respectively. Access to both pipes is via an 11.19 inch window 18 in top drive unit 10.

As discussed in the background section above, caustic mud at pressures in excess of 5000 psi travels through both pipes and, in the prior art, the junction between the pipes is sealed by V-type packing. This packing material, however, generates excessive heat and when it fails it can take between 1–5 hours to replace the packing resulting in costly downtime for drilling operations especially given the fact that the packing type seal only last between 5 and 500 hours. Moreover, top drive unit 10 is located about 20 feet up off of the drilling platform and workmen must use a sledgehammer to replace the packing resulting in a frustrating and hazardous procedure. And, when the packing fails, it fails catastrophically resulting in many barrels of the expensive mud being spilled at a nominal cost of $1000 per barrel. Also, the spilled mud must be reclaimed at a significant cost.

Figure 4:
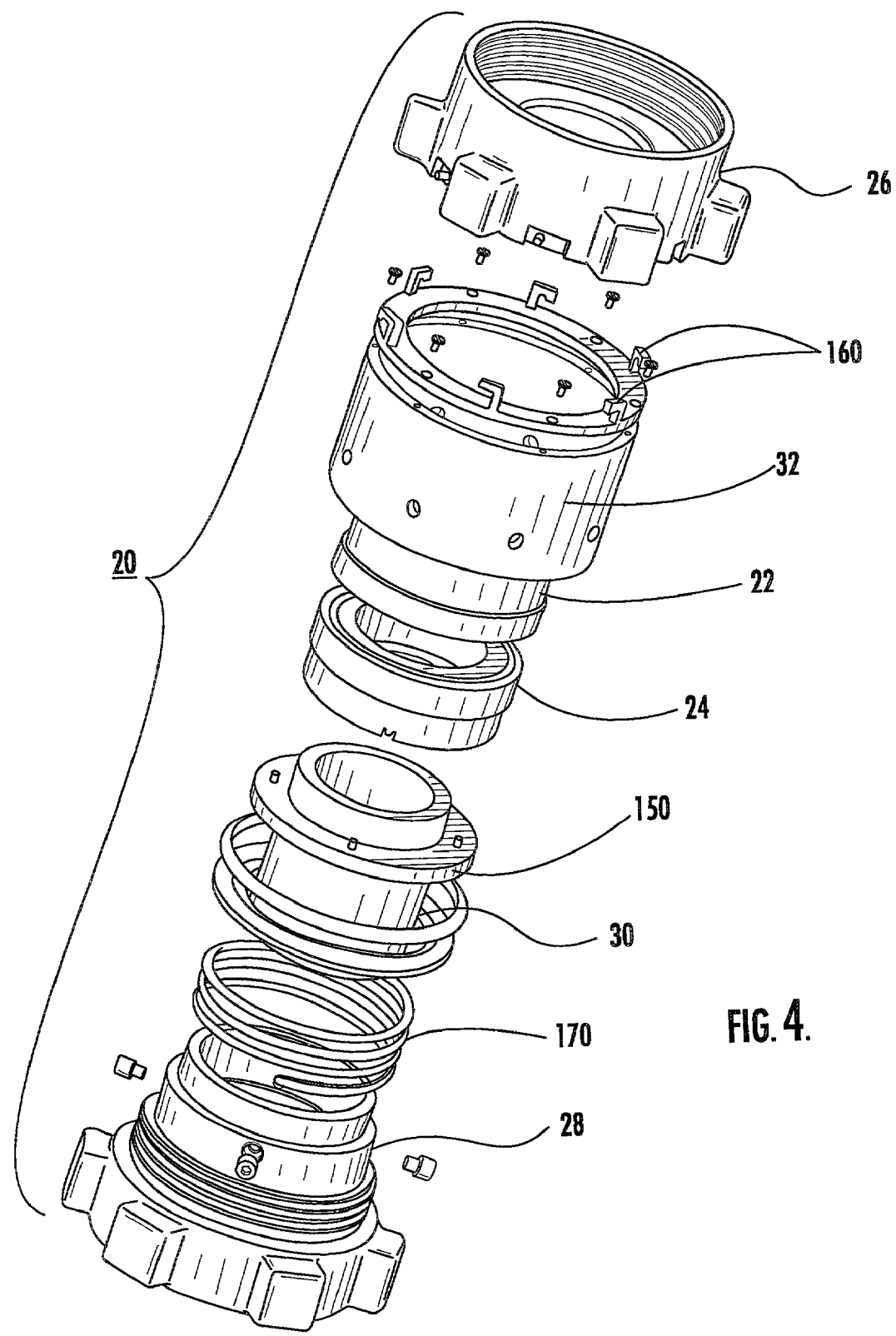
FIG. 4 is an exploded schematic view of a complete face seal assembly in accordance with one embodiment of the subject invention.

In this invention, face seal assembly 20, FIG. 4 replaces the V-type packing of the prior art and, based on test results, is expected to last in excess of 500 hours or more at normal operating conditions. Face seal assembly 20 can be installed in a half hour or less compared to the 1–5 hours required to install the prior art V-packing seal.

The primary components of face seal assembly 20 include annular stationary mating ring housing 22 and annular rotating sealing ring housing 24, both of which are preferably interchangeable. Also included is annular upper or first gland assembly 26 coupled to mating ring housing 22 on the proximal end thereof and coupled to upper stationary pipe 12, FIGS. 1–2 on the distal end thereof. Lower or second annular gland assembly 28, FIG. 4 is coupled to lower rotating pipe 14, FIGS. 1 and 3. Sleeve 30, FIG. 4 interconnects rotating sealing ring housing 24 with lower gland assembly 28. Thus, lower gland assembly 28, sleeve assembly 30, and sealing ring housing 24 rotate with lower pipe 14 while mating ring housing 22 and upper gland assembly 26 do not rotate. Stationary cover 32 which extends between upper gland assembly 26 and lower gland assembly 28 prevents catastrophic fluid leakage if the seal does fail.

Figure 5:
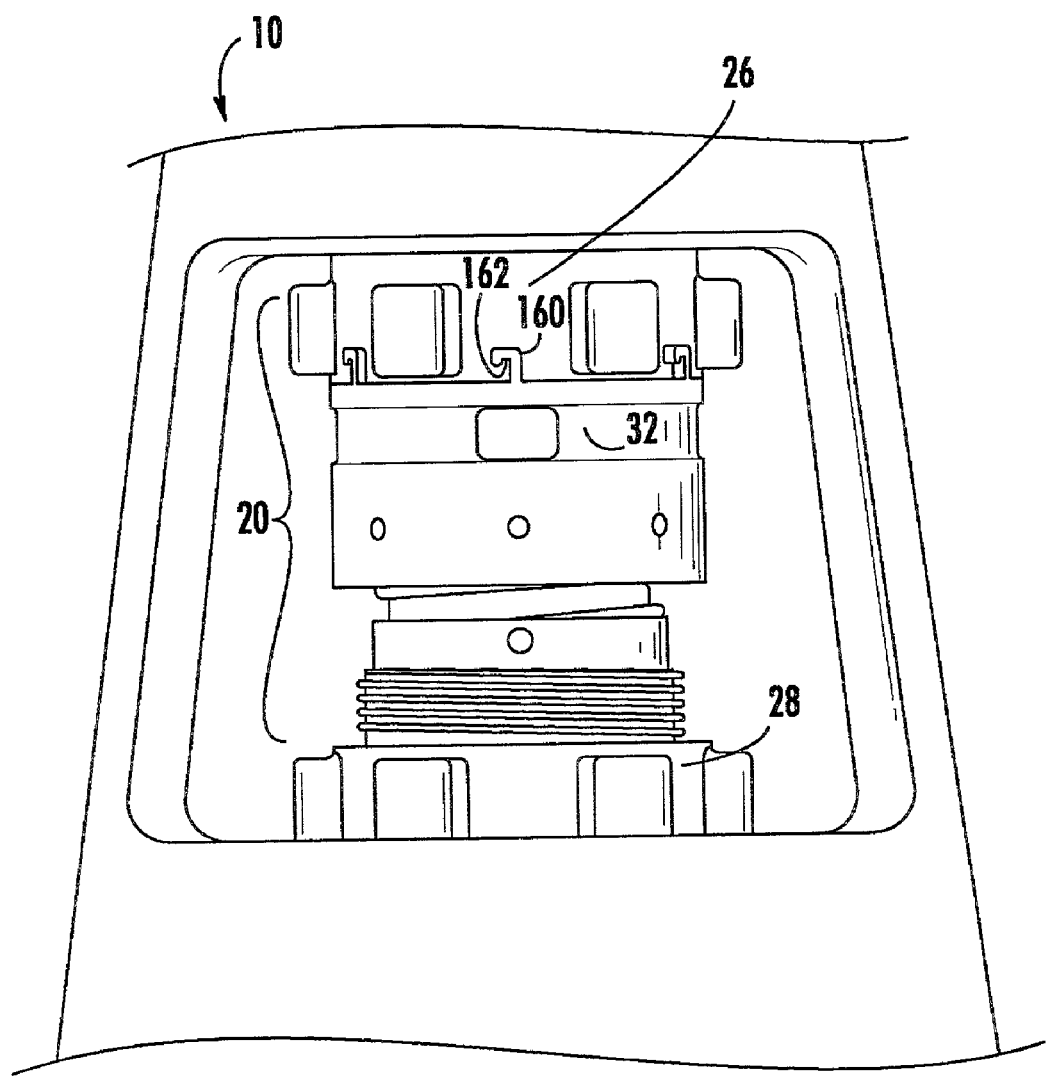
FIG. 5 is a schematic front view showing the face seal assembly of FIG. 4 installed in the drive unit of FIG. 1 between the upper stationary and lower rotating pipes.

FIG. 5 shows the components of assembly 20, FIG. 4 installed in top drive unit 10 thus sealing stationary upper pipe 12, FIG. 1 with respect to rotating lower pipe 14. Note, however, that the invention is not limited to this specific application and moreover it is not orientation specific. For example, in other examples, pipe 12 could rotate and pipe 14 could be stationary or both pipes could rotate. Also, the "pipes" could be any conduit or indeed any region of high pressure which must be sealed with respect to another region.

Figure 6:
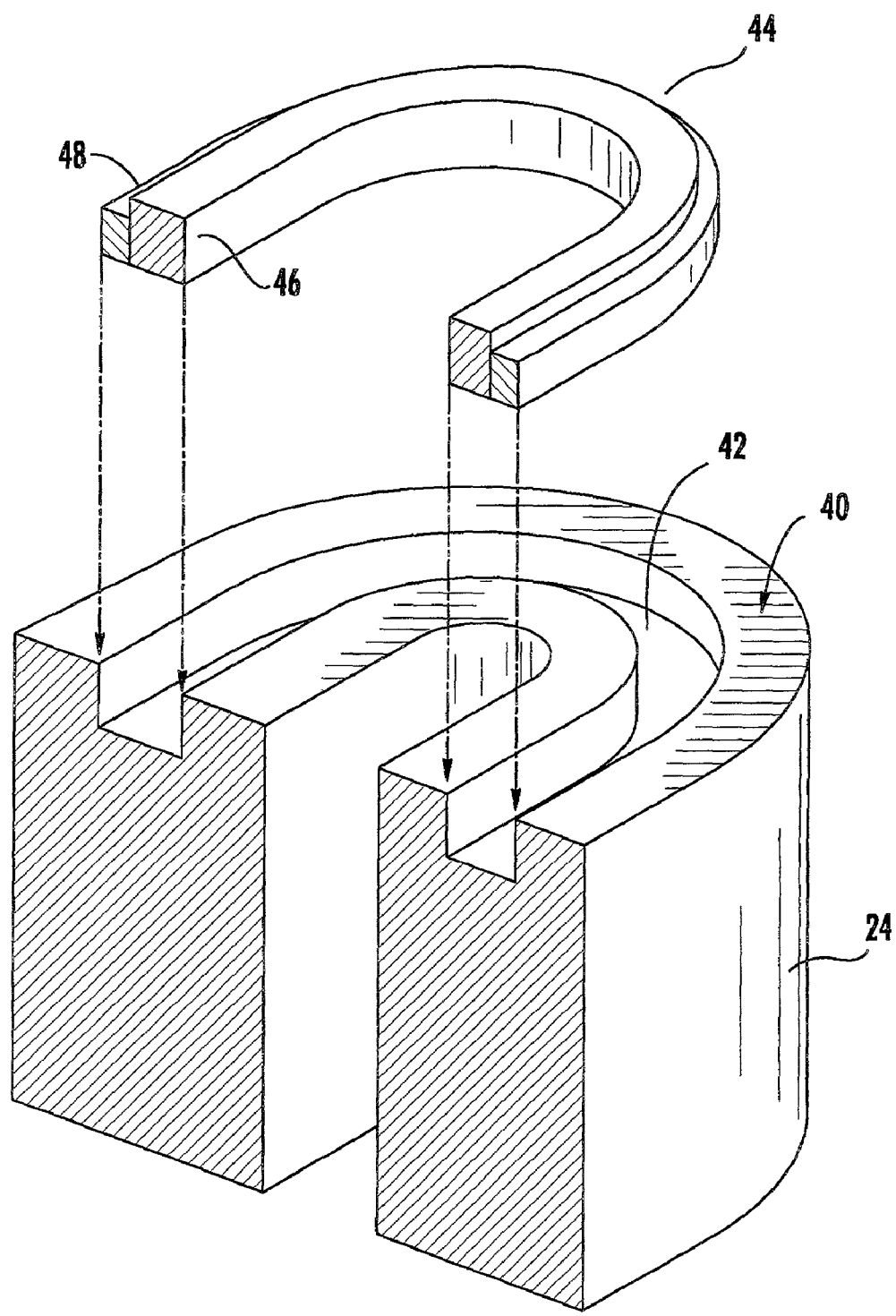
FIG. 6 is a partial schematic view showing the primary components associated with the sealing ring housing component of the assembly shown in FIG. 4.
Figure 7:
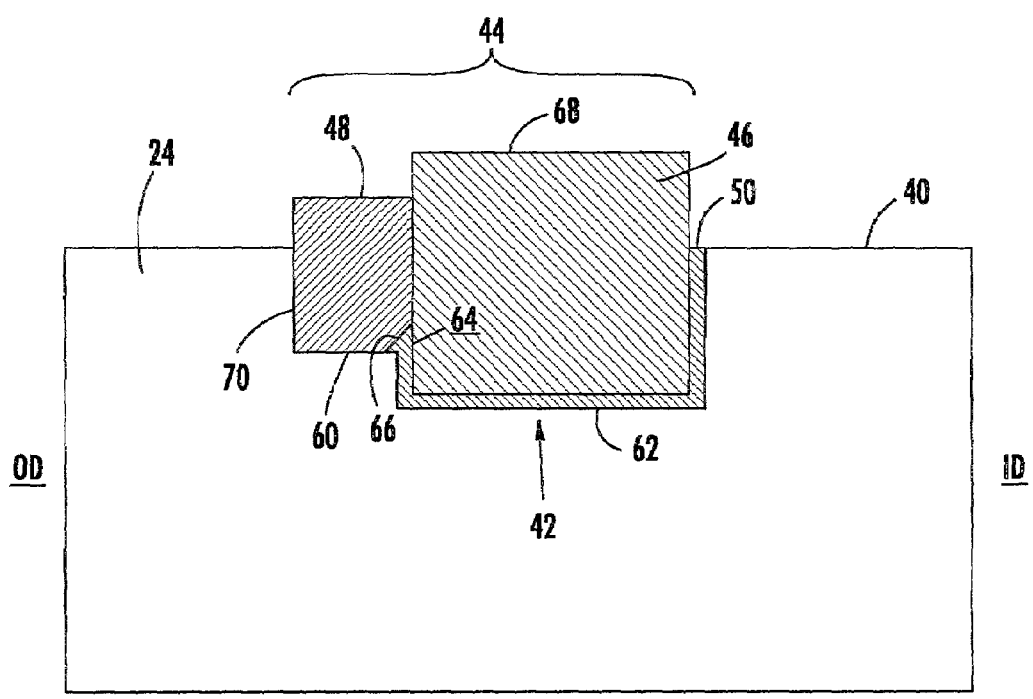
FIG. 7 is a cross-sectional view showing the primary components associated with the sealing ring housing shown in FIG. 6.

One reason assembly 20, FIGS. 4–5 is expected to last an order of magnitude longer than prior art V-packing seals is that both the sealing ring and the mating ring are continuously under compression. The following discussion relates to sealing ring housing 24, FIG. 4 but also holds true for mating ring housing 22. In the preferred embodiment, annular sealing ring housing 24, FIGS. 6–7 has distal end surface 40 with channel 42 therein. Seal ring insert 44 is disposed in channel 42 and includes ceramic seal ring 46 compressed by a body such as a stainless steel band 48 which exerts as much as 20,000 psi compressive stress on ceramic seal ring 46 by heating band 48 to a temperature of 800° F. and shrink fitting band 48 onto ceramic seal ring 46. This combined insert 44 is then epoxyed into the channel of housing 24 as shown in FIG. 7. Epoxy 50 also prevents fluid from getting behind insert 44. Band 48 maintains brittle ceramic seal ring 46 in hoop compression and minimizes any other tensile stresses from axial or radial stresses.

In the working example, seal ring 46 is made of silicon carbide and is 0.340 inches tall, has an inner diameter of 4.484 inches and an outer diameter of 5.434 inches. Band 48 is made of 17-4 H1150 stainless steel, is 0.258 inches tall, has an inside diameter of 5.416 inches and an outside diameter of 5.926 inches. Epoxy 50 is typically 3M SCOTCH-WELD™ 1838 8/A green epoxy adhesive. Housing 24 is made of 17-4 H1150 stainless steel and is 2.200 inches tall, has an inside diameter of 3.75 and an outside diameter of 6.50. Channel 42 begins 0.290 inches from the outside diameter of housing 24, has a width 0.728 and a depth of 0.242 at step 60 and a depth of 0.272 at portion 62. Sealing ring 46 preferably has lower outer chamfer 64 and band 48 has inner chamfer 66 as shown. The sealing face 68 of seal ring 46 extends slightly beyond mating ring 48 as shown, e.g., 0.06 inches. Insert 44 is placed in channel 42 using only slight pressure such that band 48 is press fit against side 70 of channel 42 to maintain the flatness of sealing face 68 of seal ring 46.

Still, in other designs, band 48 could be replaced with some other body or even eliminated and seal ring 46 could be shrunk fit directly into a body or housing to keep seal ring 46 under compression. The design of FIG. 7 is preferred, however, because as the pressure increases, band 48 increases in stiffness where it contacts housing 24 to offset any rocking action and to provide a restoration force if there is a rocking of seal ring 46. If seal ring 46 is press fit directly into the housing, it could be more difficult to maintain the flatness of sealing face 68.

Figure 8:
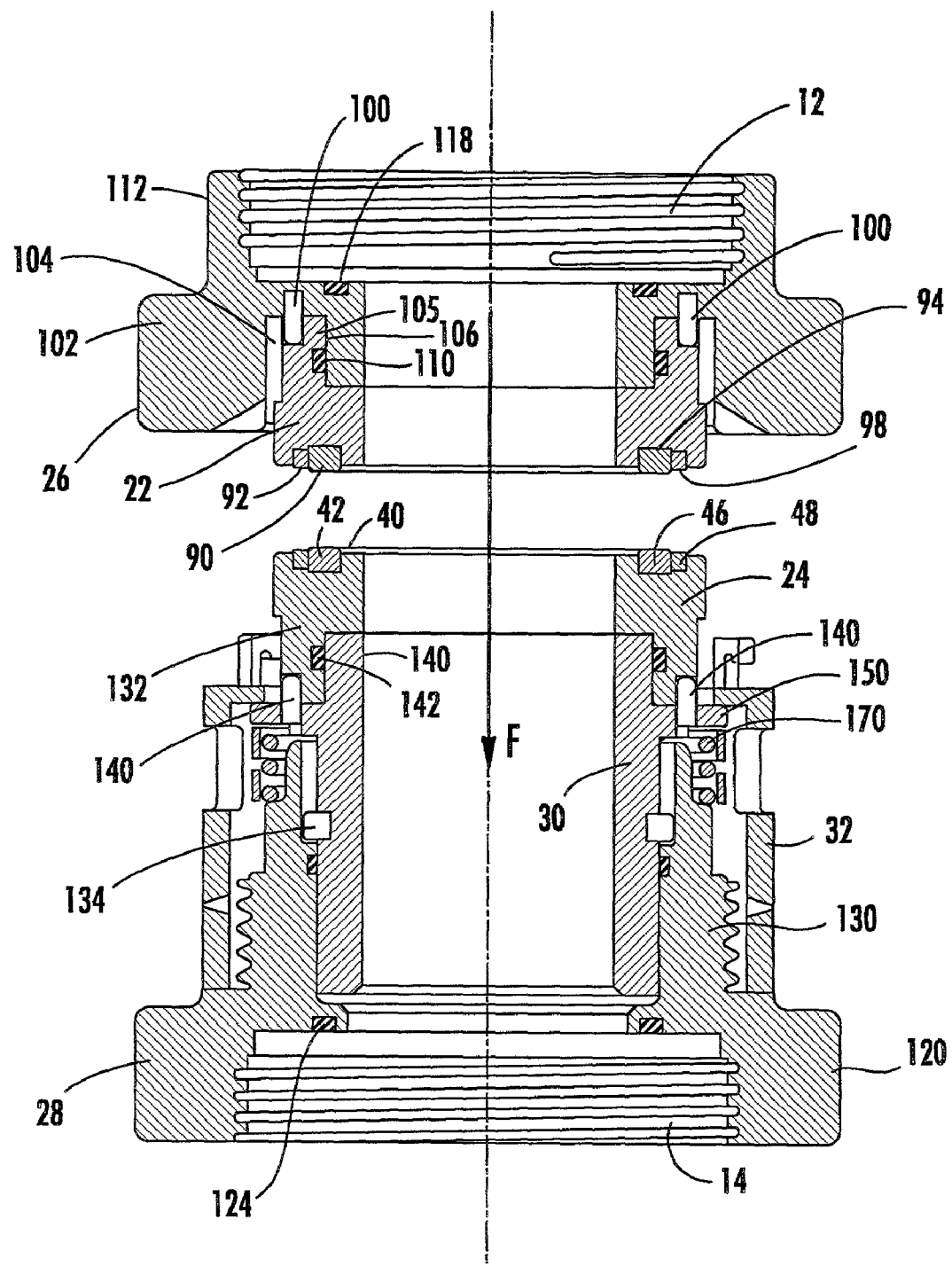
FIG. 8 is a cross-sectional schematic view of the complete face seal assembly shown in FIG. 4.

As explained above, mating ring housing 22, FIG. 8 is preferably constructed the same way as sealing ring housing 24—indeed, it is preferred that mating ring housing 22 is interchangeable with sealing ring housing 24. In this way, once the complete assembly is installed as shown in FIG. 8, only seal ring housing 24 and mating ring housing 22 need be replaced or refurbished by removing their respective inserts and installing new inserts.

Thus, mating ring housing 22 also has a) channel 94 in proximal end surface 98 the same as channel 42 in distal end surface 40 of sealing ring housing 24, b) mating ring 90 the same as sealing ring 46, and c) band 92 the same as band 46. Mating ring 90 thereby faces and contacts sealing ring 46 to prevent fluid F under pressure from escaping therebetween.

As discussed above, the typical use for this arrangement is when both mating ring 90 and sealing ring 46 define mating tribological sealing faces within an inside diameter and an outside diameter and the fluid F is pressured on the inside diameter. In the oil drilling application discussed above, the pressure of fluid F is in excess of 5,000 psi but the assembly shown in FIG. 8 was tested to 10,000 psi with no significant leakage due to the 20,000 psi compression hoop force exerted by the bands on the rings.

Figure 11:
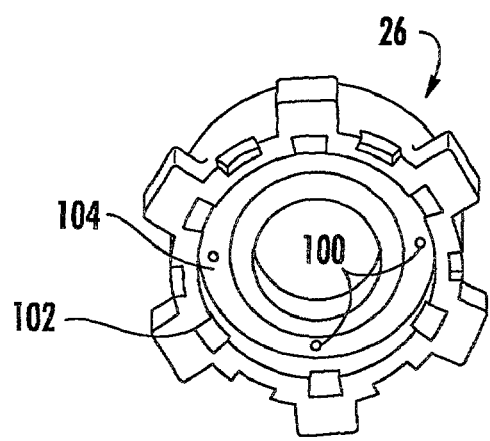
FIG. 11 is a schematic view showing the bottom of the upper gland assembly component of the face seal assembly of the subject invention.
Figure 12:
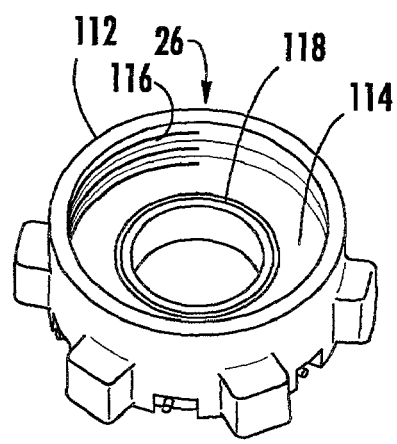
FIG. 12 is a schematic top view of the upper gland assembly shown in FIG. 11.

In the preferred embodiment, upper coupling or gland assembly 26 is coupled to mating ring housing 26 via anti-rotation pins 100. In the following description, distal is up in FIG. 8 and to the left in FIG. 9 and proximal is down in FIG. 8 and to the right in FIG. 9, but such an orientation is not a limitation of this invention. As shown in FIGS. 8 and 11–12 upper annular gland assembly 26 includes proximal end 102 with recess 104 therein for receiving reduced diameter portion 105 of the distal end 106 of mating ring housing 22. O-ring seal 110 is typically disposed between the distal end 106 of mating ring housing 22 and the proximal end 102 of upper annular gland assembly 26.

As shown most clearly in FIG. 12, the distal end 112 of upper gland assembly 26 includes drive pipe seat 114 surrounded by cowling 116 with female or internal threads as shown which fit onto the male or external threads of drive pipe 12, FIGS. 1–2. Seat 114 has a channel with O-ring seal 118 disposed therein.

Figure 13:
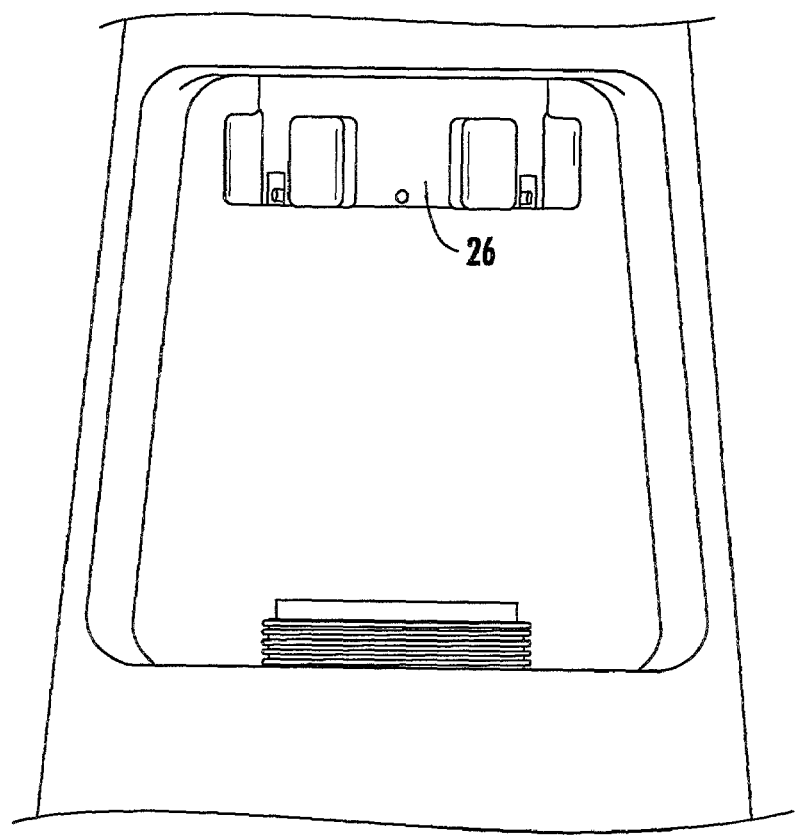
FIG. 13 is a schematic view showing the upper gland assembly of FIGS. 11 and 12 installed on the upper stationary drive pipe of the drive unit shown in FIG. 1.

FIG. 13 shows upper gland assembly 26 installed on upper drive pipe 12, FIGS. 1–2 and 8–10. After the existing wash pipe assembly is removed and the threads and O-ring surfaces clean, and refurbished if necessary, MOLY-B or any other commercially acceptable anti-seize compound is applied to the upper and lower threads. The upper gland assembly is then checked to ensure that O-ring 118 has been lubricated using petroleum grease and is installed properly. Then upper gland assembly 26 is raised and threaded onto the top drive upper threads and a VARCO spanner wrench or equivalent used to bottom upper gland assembly and seat O-ring 118.

Figure 9:
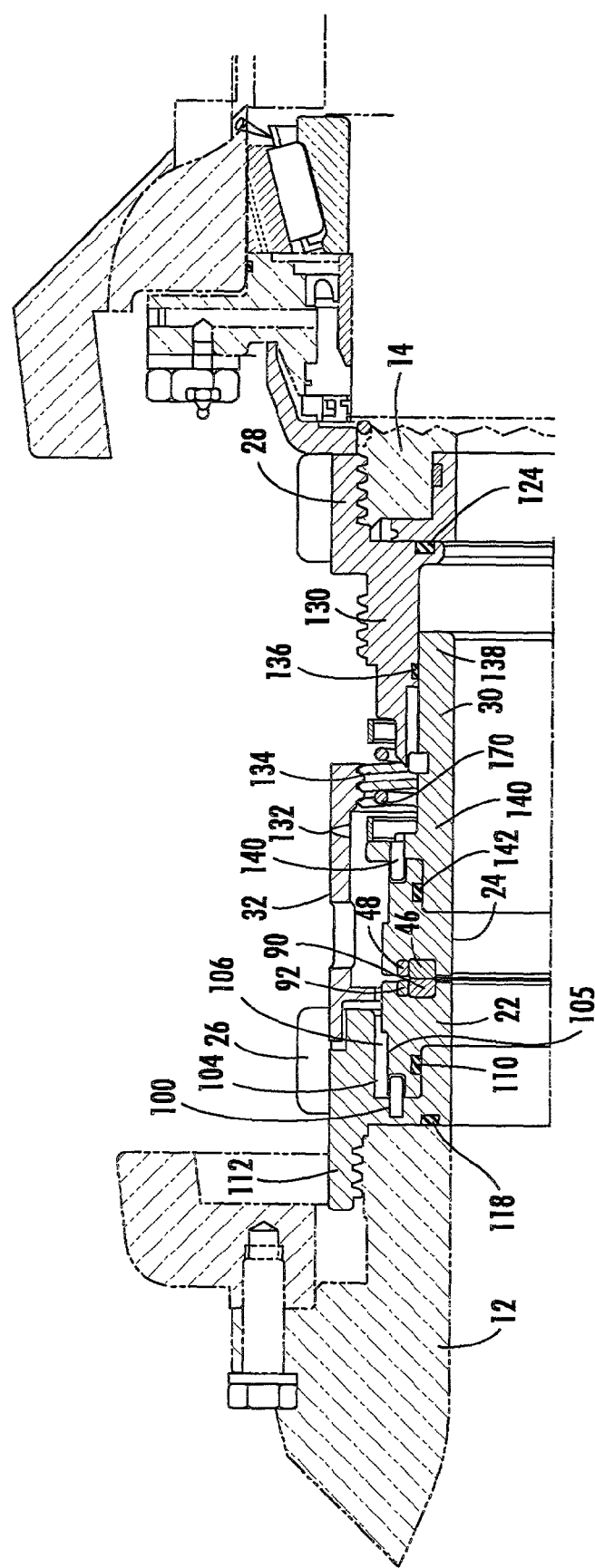
FIG. 9 is another partial schematic cross-sectional view of the face seal assembly shown in FIG. 8.
Figure 10:
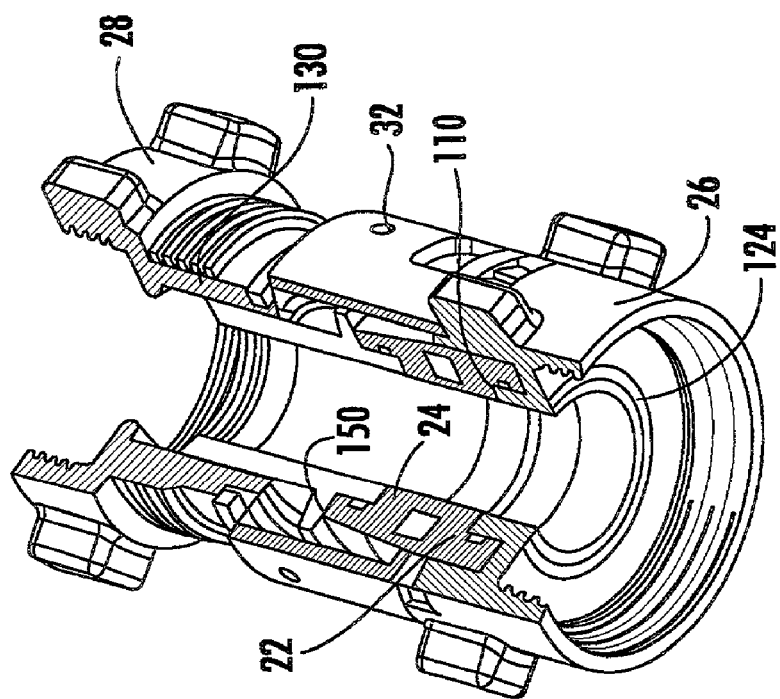
FIG. 10 is a schematic cut-away view of the face seal assembly shown in FIG. 9.
Figure 14:
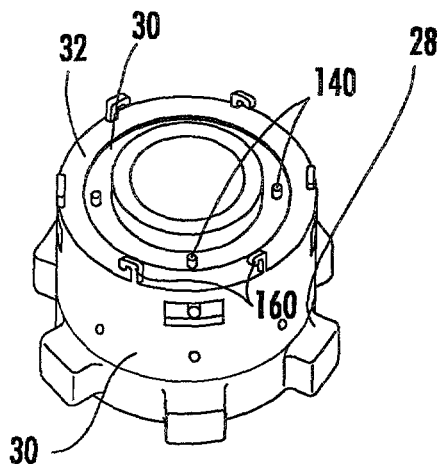
FIG. 14 is a schematic top view of the lower gland assembly, sleeve, and cover of this invention.
Figure 15:
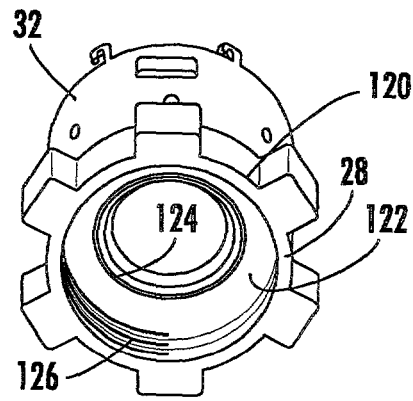
FIG. 15 is a schematic bottom view of the lower gland assembly, sleeve, and cover of this invention.

As shown most clearly in FIGS. 8 and 14–15, lower gland assembly 28 includes proximal end 120 with seat 122, FIG. 15 for receiving drive pipe 14, FIGS. 1 and 3 therein. Seat 122, FIG. 15 includes O-ring seal 124 disposed in a groove. FIGS. 8–10 also show O-ring seal 124. Seat 122, FIG. 15 is surrounded by collar 126 within internal threads as shown which mate with the external threads of drive pipe 14, FIGS. 1 and 3. Distal end 130, FIGS. 8–10 of the lower gland assembly surrounds sleeve 30 coupled to proximal end 132 of seal ring housing 124 via pins 134 extending from collar 150. Dynamic seal 136, FIGS. 8–9 is disposed between proximal end 138 of sleeve 30 and second or lower gland unit 28. Pins 134, FIGS. 8–9 and 14 couples sleeve 30 to proximal end 132 of sealing ring housing 24 and O-ring seal 142, FIGS. 8–9 is disposed between the distal end 140 of sleeve 30 and proximal end 132 of seal ring housing 24.

Cover 32, FIGS. 8–9 and 14–15, when fully installed, extends between upper gland assembly 26, FIGS. 9–10 and lower gland assembly 28. Cover 32, FIG. 14 includes hook tabs 160 receivable on posts 162, FIG. 16 of upper gland assembly 26. Also, spring 170, FIGS. 4 and 8–9 is disposed between collar 150 of sleeve assembly 30 and second gland assembly 28.

Figure 16:
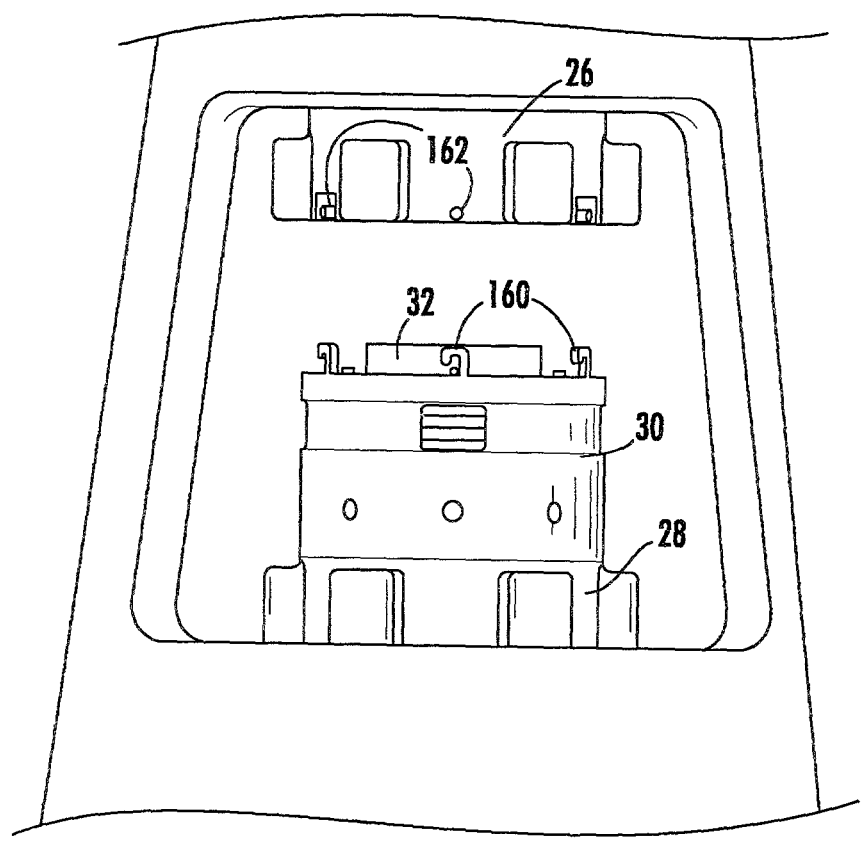
FIG. 16 is schematic view showing the lower gland assembly, sleeve, and cover of FIGS. 14–15 installed on the bottom rotating drive pipe of FIG. 1.
Figure 17:
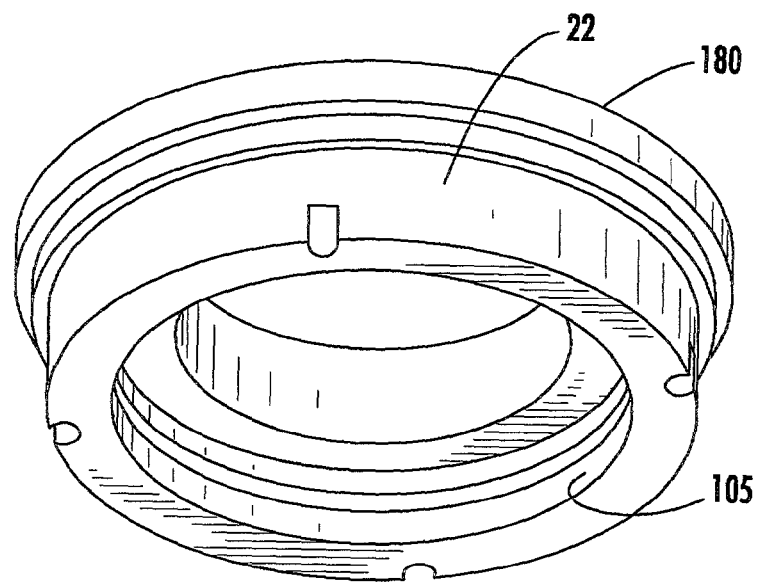
FIG. 17 is a schematic three dimensional view showing the bottom of the mating ring assembly of the subject invention.
Figure 18:
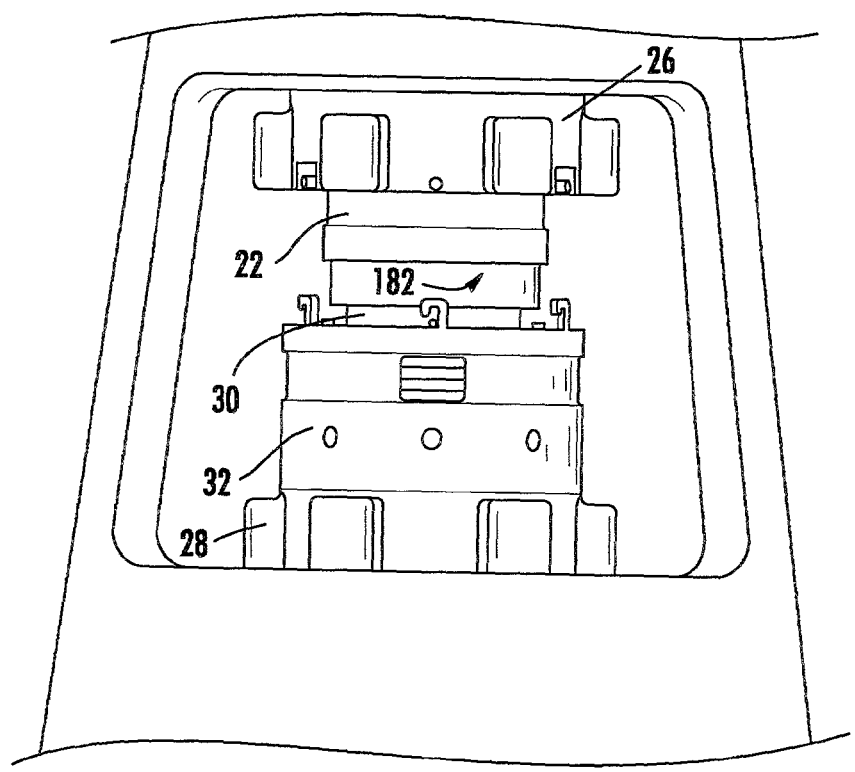
FIG. 18 is a schematic view showing the installation of the mating ring assembly of FIG. 17 in the top drive unit of FIG. 1 and the use of an installation tool.

FIG. 16 shows the combination of the second or lower coupling, e.g., lower gland assembly 28, cover 32, and sleeve 30 installed in a preassembled configuration on the lower threads of the top drive unit. Again, O-ring 124, FIG. 15 is lubricated with petroleum grease and lower gland assembly 28 threaded onto the lower drive of the top drive unit. As this stage, the spanner wrench is not used to bottom gland 28 down. Instead, mating ring assembly 22, FIG. 17 with protective cover 180 attached thereto is first installed with respect to upper gland assembly 26, FIG. 18. The O-ring and backup ring are lubricated using a petroleum based grease and Teflon installation tool 182 is readied. Protective cover 180, FIG. 17 is removed from mating ring housing 22 and mating ring housing 22 is gently turned into upper gland assembly 26, FIG. 18 until the anti-rotation pins are located. While still holding the mating ring assembly, installation tool 182 is inserted between sleeve 30 and mating ring assembly 22 as shown in FIG. 18.

Figure 19:
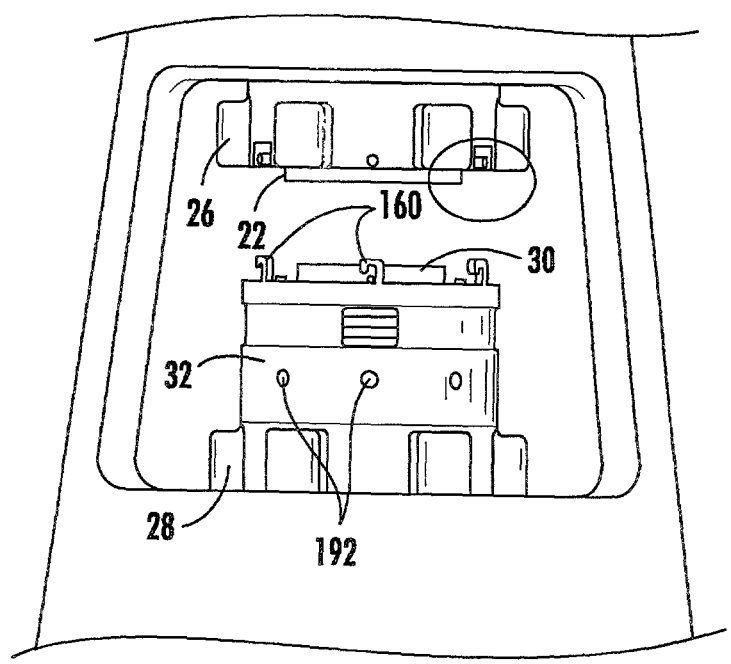
FIG. 19 is a schematic view showing the mating ring assembly installed on the upper gland.

Now lower gland assembly 28 is slowly rotated to ensure that the assembly raises the pins (100, FIG. 11) internal to upper gland assembly 36 are engaging the slots in mating ring assembly 22. A spanner wrench is used to get the O-ring and backup ring onto the upper gland assembly shoulder diameter. When installed, the distance from the face of the upper gland assembly to the end of the mating ring assembly is about 0.57 inches. The mating ring housing should stay in place when the lower gland assembly is backed down as shown in FIG. 19.

Figure 20:
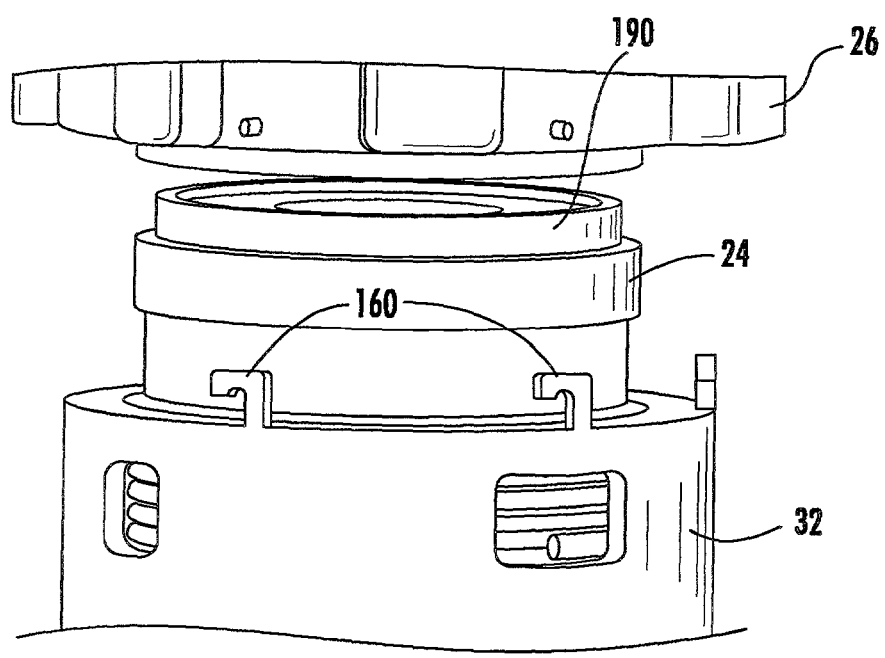
FIG. 20 is a schematic view showing the use of another installation tool in the final step in the installation of the face seal assembly of this invention.

Next seal ring housing 24, FIG. 20 is installed. Its O-ring and backup ring are lubricated again using a petroleum based grease. Seal ring housing 24 is placed onto sleeve 30, FIG. 19 as shown in FIG. 20 ensuring that the anti-rotation slots of seal ring housing 24 are located on the anti-rotation pins (140, FIG. 9) located in sleeve 30. The protective cover on seal ring housing 24 is then removed. Thin Teflon installation tool 190 is then placed on top of seal ring housing 24 as shown in FIG. 20. The lower gland assembly is then rotated ensuring that as the assembly rises, the pins to the lower gland sleeve are engaging the slots in the seal ring assembly. A spanner wrench is used to get the O-ring and back ring onto the sleeve shoulder diameter. The cover is then unscrewed either by hand or by placing a rod into lower holes 192 of the cover and, once fully unscrewed, J hooks 160 of cover 32 are placed onto the outer pins 162 located on the upper gland assembly and the seal is now ready for operation as shown in FIG. 5.

Thus, the face seal of this invention is useful, inter alia, in applications where the inner diameter of the face seal is subjected to high pressures and, in one embodiment, a complete face seal assembly is provided for, inter alia, the top drive unit of an offshore drilling rig. The face seal assembly can be easily installed in ½ hour or less compared to the 1–5 hours required to install prior art V-packing seals. The face seal exhibits a mean-time-between failures and order of magnitude greater than prior art V-packing seals and is more reliable than prior art V-packing type seals even in a caustic environment. Because of its reliability and long mean-time-between failures, and because of the ease of installation, costly downtime is severely reduced. Even when the face seal fails, it does not result in the release of drilling fluid or mud.

But, the face seal and assembly of the particular embodiment described herein is useful in industries and applications other than offshore drilling applications.

In any embodiment, a novel face seal is constructed to withstand high internal pressures by radially compressing the mating and sealing rings by a band, for example, to offset the force of the high internal pressures and to prevent cracking of the rings. The band maintains the brittle ceramic rings in hoop compression and minimizes any tensile stresses from axial or radial stresses.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. The embodiment disclosed in the subject application is not to be taken as the only possible embodiment. Other embodiments will occur to those skilled in the art and are within the following claims:

What is claimed is:

1. A face seal assembly implemented in a drilling unit between a rotating drive pipe and a stationary drive pipe, the face seal assembly comprising:
   an annular mating ring housing having a proximal end surface with a channel therein;
   a mating ring insert disposed in the channel, the mating ring insert including a mating ring compressed within a first band to maintain the integrity of the mating ring;
   an annular sealing ring housing having a distal end surface with a channel therein;
   a sealing ring insert disposed in the channel, the sealing ring insert including a sealing ring compressed within a second band to maintain the integrity of the sealing ring, the mating ring facing the sealing ring to prevent fluid from escaping therebetween;
   a first annular gland assembly with a proximal end for receiving the distal end of the mating ring housing and a distal end including a seat for receiving the stationary drive pipe therein; and
   a second annular gland assembly with a proximal end including a seat for receiving the rotating drive pipe therein and a distal end surrounding a sleeve coupled to the proximal end of the sealing ring housing.

2. The assembly of claim 1 in which the mating ring defines a sealing face with an inside diameter and an outside diameter, the fluid pressurized on the inside diameter.

3. The assembly of claim 2 in which the sealing face of the mating ring extends slightly beyond the first band.

4. The assembly of claim 1 in which the sealing ring defines a sealing face with an inside diameter and an outside diameter, the fluid pressurized on the inside diameter.

5. The assembly of claim 4 in which the sealing face of the sealing ring extends slightly beyond the second band.

6. The assembly of claim 1 in which the mating ring and the sealing ring are made of a ceramic material.

7. The assembly of claim 6 in which the ceramic material is silicon carbide.

8. The assembly of claim 1 in which the first and second bands are made of metal.

9. The assembly of claim 8 in which the metal is stainless steel.

10. The assembly of claim 1 in which the first band is press fit against one side of the channel in the mating ring housing.

11. The assembly of claim 1 in which the second band is press fit against one side of the channel in the sealing ring housing.

12. The assembly of claim 1 in which the channel in the proximal end surface of the mating ring housing includes a step, the first band disposed on the step.

13. The assembly of claim 1 further including bonding material disposed between the channel and the mating ring for preventing fluid from escaping behind the mating ring.

14. The assembly of claim 1 in which the channel in the distal end surface of the sealing ring housing includes a step, the second band disposed on the step.

15. The assembly of claim 14 further including bonding material disposed between the channel and the sealing ring for preventing fluid from escaping behind the sealing ring.

16. The assembly of claim 1 in which the mating ring includes a lower outer chamfer and the first band includes a lower inner chamfer.

17. The assembly of claim 1 in which the sealing ring includes a lower outer chamfer and the second band includes a lower inner chamfer.

18. The assembly of claim 1 in which the proximal end of the first annular gland assembly includes a recess therein.

19. The assembly of claim 18 further including a seal disposed between the distal end of the mating ring housing and the proximal end of the first annular gland assembly.

20. The assembly of claim 19 in which said seal is an O-ring.

21. The assembly of claim 18 in which the distal end of the mating ring housing includes a reduced diameter portion received in the recess of the proximal end of the first annular gland assembly.

22. The assembly of claim 21 further including a pin interconnecting the reduced diameter portion of the mating ring housing with the proximal end of the first annular gland assembly.

23. The assembly of claim 1 in which the seat of the distal end of the first annular gland assembly is surrounded by a cowling.

24. The assembly of claim 23 in which the stationary drive pipe has male threads and the cowling includes female threads mating therewith.

25. The assembly of claim 23 in which the seat includes a seal member.

26. The assembly of claim 25 in which the seal member is an O-ring disposed in a channel in a groove in the seat.

27. The assembly of claim 1 in which the seat of the second annular gland assembly includes a seal member.

28. The assembly of claim 27 in which the seal member is an O-ring disposed in a groove in the seat.

29. The assembly of claim 1 in which the seat of the second annular gland assembly is surrounded by a collar.

30. The assembly of claim 29 in which the collar includes internal threads mating with external threads of the rotating drive pipe.

31. The assembly of claim 1 further including at least one pin interconnecting the second gland assembly with the sleeve.

32. The assembly of claim 1 further including a seal disposed between the proximal end of the sleeve and the second annular gland assembly.

33. The assembly of claim 32 in which said seal is a dynamic seal.

34. The assembly of claim 1 further including at least one pin coupling the sleeve to the proximal end of the sealing ring housing.

35. The assembly of claim 1 further including a seal between the distal end of the sleeve and proximal end of the sealing ring housing.

36. The assembly of claim 35 in which the seal is an O-ring.

37. The assembly of claim 1 in which said sleeve includes a collar for receiving the proximal end of the sealing ring housing.

38. The assembly of claim 37 further including a spring disposed between the collar of the sleeve and the distal end of the second gland assembly.

39. The assembly of claim 1 further including a cover disposed over the sealing faces of the mating ring and the sealing ring.

40. The assembly of claim 39 in which said cover extends between the first gland assembly and the second gland assembly.

41. The assembly of claim 40 in which said cover includes hooks receivable by the first gland assembly removably coupling the cover thereto.

42. A mechanical face sealing assembly implemented in a drilling unit between a first pipe and a second pipe, the face sealing assembly comprising:
a first pipe having a distal end;
a second pipe having a proximal end spaced from the distal end of the first pipe, the first and second pipes rotatable with respect to each other;
a first ring compressed within a first band, said first ring having a tribological sealing face and surrounded by the first band;
a second ring compressed within a second band, said second ring having a tribological sealing face and surrounded by the second band, the tribological sealing face of the first ring facing the tribo logical sealing face of the second ring for sealing the first pipe with respect to the second pipe;
a first housing for the first compressed ring and a second housing for the second compressed ring; and
a first coupling for connecting the first housing to the first pipe and a second coupling for connecting the second housing to the second pipe.

43. The assembly of claim 42 in which the first and second compressed rings are made of ceramic material.

44. The assembly of claim 42 in which the first band is shrunk fit about the first compressed ring.

45. The assembly of claim 44 in which the first band is made of metal.

46. The assembly of claim 42 in which the second band is shrunk fit about the second compressed ring.

47. The assembly of claim 42 in which the first housing includes a channel for receiving the first ring.

48. The assembly of claim 42 in which the first pipe is stationary and the first compressed ring is a mating ring.

49. The assembly of claim 42 in which the second pipe rotates and the second compressed ring is a sealing ring.

50. A method of making a face seal assembly for implementation in a drilling unit, the method comprising:
forming an annular mating ring housing to have a proximal end surface with a channel therein;
disposing a mating ring insert in the channel, the mating ring insert including a mating ring compressed within a first band to maintain the integrity of the mating ring;
forming an annular sealing ring housing to have a distal end surface with a channel therein;
disposing a sealing ring insert in the channel, the sealing ring insert including a sealing ring compressed within a second band to maintain the integrity of the sealing ring;
orienting the mating ring to face the sealing ring to prevent fluid from escaping therebetween;
disposing the distal end of the mating ring housing in a proximal end of a first gland assembly, said first gland assembly including a distal end having a seat for receiving a stationary drive pipe therein; and
coupling the proximal end of the sealing ring housing to a sleeve surrounded by a distal end of a second gland assembly, said second gland assembly including a proximal end having a seat for receiving a rotating drive pipe therein.

51. The method of claim 50 in which the mating ring is shrunk fit in the first band and the sealing ring is shrunk fit in the second band.

52. A face seal assembly disposed to seal a first stationary shaft with respect to a second rotating shaft in a drilling unit, the assembly comprising:
an annular mating ring housing having a proximal end surface with a channel therein;
a mating ring insert disposed in the channel, the mating ring insert including a mating ring compressed within a first band to maintain the integrity of the mating ring;
an annular sealing ring housing having a distal end surface with a channel therein; and
a sealing ring insert disposed in the channel, the sealing ring insert including a sealing ring compressed within a second band to maintain the integrity of the sealing ring;
a first coupling connecting the mating ring housing to the first stationary shaft; and
a second coupling connecting the sealing ring housing to the second rotating shaft.

53. A face seal assembly comprising:
an annular mating ring housing having a proximal end surface with a channel therein;
a mating ring insert disposed in the channel, the mating ring insert including a mating ring compressed within a first band to maintain the integrity of the mating ring;
an annular sealing ring housing having a distal end surface with a channel therein;
a sealing ring insert disposed in the channel, the sealing ring insert including a sealing ring compressed within a second band to maintain the integrity of the sealing ring, the mating ring facing the sealing ring to prevent fluid from escaping therebetween;
a first annular gland assembly coupled to a distal portion of the mating ring housing;
a second annular gland assembly with a proximal end having a seat for receiving a drive pipe therein, said second annular gland assembly further including a distal end surrounding a sleeve coupled to a proximal end of the sealing ring housing; and
a cover disposed over sealing faces of the mating ring and the sealing ring.

54. The assembly of claim 53 in which said cover extends between the first gland assembly and the second gland assembly.

55. The assembly of claim 54 in which said cover includes hooks receivable by the first gland assembly removably coupling the cover thereto.

56. A face seal assembly comprising:

an annular mating ring housing having a proximal end surface with a channel therein;

a mating ring insert disposed in the channel, the mating ring insert including a mating ring compressed within a first band to maintain the integrity of the mating ring;

an annular sealing ring housing having a distal end surface with a channel therein;

a sealing ring insert disposed in the channel, the sealing ring insert including a sealing ring compressed within a second band to maintain the integrity of the sealing ring, the mating ring facing the sealing ring to prevent fluid from escaping therebetween;

a first gland assembly with a proximal end for receiving the distal end of the mating ring housing and a distal end including a seat surrounded by a cowling and including a seal member, said seat for receiving a drive pipe therein; and a second gland assembly with a proximal end including a seat for receiving a drive pipe therein and a distal end surrounding a sleeve coupled to the proximal end of the sealing ring housing.

57. The assembly of claim 56 in which the seal member is an O-ring disposed in a channel in a groove in the seat.

58. A face seal assembly comprising:

an annular mating ring housing having a proximal end surface with a channel therein;

a mating ring insert disposed in the channel, the mating ring insert including a mating ring compressed within a first band to maintain the integrity of the mating ring;

an annular sealing ring housing having a distal end surface with a channel therein;

a sealing ring insert disposed in the channel, the sealing ring insert including a sealing ring compressed within a second band to maintain the integrity of the sealing ring, the mating ring facing the sealing ring to prevent fluid from escaping therebetween;

a first gland assembly with a proximal end for receiving the distal end of the mating ring housing and a distal end including a seat for receiving a drive pipe therein; and a second gland assembly with a proximal end including a seat including a seal member for receiving a drive pipe therein and a distal end surrounding a sleeve coupled to the proximal end of the sealing ring housing.

59. The assembly of claim 58 in which the seal member is an O-ring disposed in a groove in the seat.

60. A face seal assembly comprising:

an annular mating ring housing having a proximal end surface with a channel therein;

a mating ring insert disposed in the channel, the mating ring insert including a mating ring compressed within a first band to maintain the integrity of the mating ring;

an annular sealing ring housing having a distal end surface with a channel therein;

a sealing ring insert disposed in the channel, the sealing ring insert including a sealing ring compressed within a second band to maintain the integrity of the sealing ring, the mating ring facing the sealing ring to prevent fluid from escaping therebetween;

a first gland assembly with a proximal end for receiving the distal end of the mating ring housing and a distal end including a seat for receiving a drive pipe therein; and a second gland assembly with a proximal end including a seat surrounded by a collar, said seat for receiving a drive pipe therein and a distal end surrounding a sleeve coupled to the proximal end of the sealing ring housing.

61. The assembly of claim 60 in which the collar includes internal threads mating with external threads of the drive pipe.

* * * * *